(12) United States Patent
Ochs

(10) Patent No.: US 8,907,036 B2
(45) Date of Patent: Dec. 9, 2014

(54) SELF-ADHESIVE SILICONE COMPOSITIONS WHICH CAN BE CROSSLINKED TO FORM ELASTOMERS

(75) Inventor: Christian Ochs, Burghausen (DE)

(73) Assignee: Wacker Chemie AG, Munich (DE)

(*) Notice: Subject to any disclaimer, the term of this patent is extended or adjusted under 35 U.S.C. 154(b) by 0 days.

(21) Appl. No.: 13/983,929

(22) PCT Filed: Feb. 17, 2012

(86) PCT No.: PCT/EP2012/052730
§ 371 (c)(1),
(2), (4) Date: Aug. 6, 2013

(87) PCT Pub. No.: WO2012/113717
PCT Pub. Date: Aug. 30, 2012

(65) Prior Publication Data
US 2013/0323428 A1   Dec. 5, 2013

(30) Foreign Application Priority Data
Feb. 25, 2011 (DE) .......................... 10 2011 004 789

(51) Int. Cl.
| | | |
|---|---|---|
| C08G 77/04 | (2006.01) | |
| C08G 77/12 | (2006.01) | |
| C08G 77/20 | (2006.01) | |
| B32B 9/04 | (2006.01) | |
| C09J 183/04 | (2006.01) | |
| C08L 83/04 | (2006.01) | |
| C08L 83/00 | (2006.01) | |

(52) U.S. Cl.
CPC ............... C09J 183/04 (2013.01); *C08G 77/20* (2013.01); *C08L 83/00* (2013.01); *C08L 2205/02* (2013.01); *C08G 77/12* (2013.01); *C08L 83/04* (2013.01)
USPC .................. 528/15; 528/31; 528/32; 428/447

(58) Field of Classification Search
CPC ......... C08G 77/04; C08G 77/12; C08G 77/20
See application file for complete search history.

(56) References Cited

U.S. PATENT DOCUMENTS

| 4,013,611 | A | | 3/1977 | Hechtl et al. | |
|---|---|---|---|---|---|
| 4,340,709 | A | * | 7/1982 | Jeram et al. | 528/15 |
| 4,535,141 | A | * | 8/1985 | Kroupa | 528/15 |
| 4,845,164 | A | * | 7/1989 | Gutek | 528/15 |
| 5,281,656 | A | * | 1/1994 | Thayer et al. | 524/601 |
| 5,371,163 | A | * | 12/1994 | Wilson | 528/15 |
| 5,679,734 | A | * | 10/1997 | Peccoux et al. | 524/267 |
| 6,001,943 | A | * | 12/1999 | Enami et al. | 528/15 |
| 6,780,919 | B2 | * | 8/2004 | Ikeno et al. | 524/493 |
| 7,527,871 | B2 | * | 5/2009 | Morita et al. | 428/447 |
| 2001/0034403 | A1 | | 10/2001 | Takuman et al. | |
| 2006/0122304 | A1 | * | 6/2006 | Matayabas | 524/430 |
| 2006/0264566 | A1 | * | 11/2006 | Cassar et al. | 524/588 |
| 2007/0106016 | A1 | * | 5/2007 | Zhu | 524/588 |
| 2007/0141250 | A1 | * | 6/2007 | Mei | 427/213 |
| 2010/0210794 | A1 | | 8/2010 | Frese et al. | |
| 2010/0282410 | A1 | | 11/2010 | Pouchelon et al. | |
| 2010/0292361 | A1 | | 11/2010 | Koellnberger | |
| 2012/0164406 | A1 | * | 6/2012 | Defaux et al. | 428/196 |
| 2012/0322942 | A1 | * | 12/2012 | Berghmans et al. | 524/783 |

FOREIGN PATENT DOCUMENTS

| CN | 1314435 | A | | 9/2001 | |
|---|---|---|---|---|---|
| CN | 101616995 | A | | 12/2009 | |
| CN | 101802296 | A | | 8/2010 | |
| DE | 2433697 | A1 | | 1/1976 | |
| DE | 102008000156 | A1 | | 7/2009 | |
| EP | 0143994 | A2 | * | 6/1985 | C08J 7/04 |
| EP | 0143994 | A2 | | 6/1985 | |
| EP | 0601882 | A1 | | 6/1994 | |
| WO | 2008084747 | A2 | | 7/2008 | |
| WO | 2009/037156 | A2 | | 3/2009 | |
| WO | 2009154261 | A1 | | 12/2009 | |

* cited by examiner

*Primary Examiner* — Robert S Loewe
(74) *Attorney, Agent, or Firm* — Brooks Kushman P.C.

(57) ABSTRACT

Self-adhesive crosslinkable silicone compositions may be transparent and prepared without conventional adhesion promoters, and contain (1) an organopolysiloxane having a minimum of two aliphatically unsaturated carbon-carbon bond-containing groups, (2) a pendant Si—H functional organopolysiloxane having at least 3 Si—H groups and a minimum of 0.7 weight percent of Si-bonded hydrogen, and (3) a linear organopolysiloxane bearing terminal Si—H groups, wherein the mol ratio of silicon-bonded hydrogen in (2) to that in [(2) and (3)] is from 0.05 to 1.

19 Claims, No Drawings

SELF-ADHESIVE SILICONE COMPOSITIONS WHICH CAN BE CROSSLINKED TO FORM ELASTOMERS

CROSS-REFERENCE TO RELATED APPLICATIONS

This application is the U.S. National Phase of PCT Appln. No. PCT/EP2012/052730 filed Feb. 17, 2012 which claims priority to German Application No. 10 2011 004 789.1 filed Feb. 25, 2011, the disclosures of which are incorporated in their entirety by reference herein.

BACKGROUND OF THE INVENTION

1. Field of the Invention

The present invention relates to self-adhesive silicone compositions which can be crosslinked to form elastomers and also their use. The invention includes silicone elastomers and material composites produced from the self-adhesive addition-crosslinking silicone compositions of the invention.

2. Description of the Related Art

It is known that platinum-crosslinking silicone rubber formulations which are brought into contact with customary substrate materials such as glasses, metals or organic plastics and subsequently vulcanized have only a low, if any, adhesive strength, so that the silicone elastomer obtained can generally be delaminated again from the substrate material concerned by application of relatively low tensile forces.

Numerous technologies for producing a strong and lasting bond between a silicone elastomer and a substrate material are known from the literature.

In principle, it is possible to modify the chemical and physical nature of the substrate material in order to improve the adhesive strength between the silicone elastomer and the substrate material. An illustrative method is pretreatment of the surface of the substrate materials by flaming, corona treatment, plasma treatment or Pyrosil® treatment. In such pretreatment steps, the surface or layer close to the surface of the substrate material is physically or chemically activated, i.e. functional groups which make formation of a bond possible and in this way contribute to achievement of a lastingly stable hard-soft material composite of silicone elastomer and substrate material are created.

Another way of producing lastingly strong material composites is application of primers to the substrate material. Such primers comprise adhesion-promoting additives and also solvents which have to be removed again after application of the primer to the substrate material.

A further possible way of producing lastingly strong composites is the provision of suitable functional groups in the volume or on the surface of the substrate material, which groups contribute to greater adhesion on vulcanization of the addition-crosslinking silicone compositions. On this subject, reference may be made, for example, to EP-A 601 882 and EP-A 143 994.

A critical disadvantage of the technologies described is that at least one additional process step for pretreatment or production of the substrate materials is necessary, and this is again undesirable in principle because of the comparatively low productivity and the higher process costs associated therewith.

For this reason, numerous approaches by means of which an improvement in the adhesion on various substrates can be brought about by use of one or more specific bonding additives and/or particular crosslinkers in the case of addition-crosslinking silicone compositions, have been described in the past. These additives which are mixed into the uncrosslinked compositions typically bring about an increase in the adhesion to a substrate material during vulcanization by action of heat or after vulcanization, possibly only after storage. Examples of these may be found, by way of illustration, in WO-A 09/037,156 and the further references cited therein.

However, the use of these specific bonding additives or specific crosslinkers is disadvantageous for a number of reasons.

The organofunctional alkoxysilanes/alkoxysiloxanes frequently used for increasing adhesion eliminate alcohol during vulcanization. Preference is typically given, for reactivity reasons, to methoxysilane derivatives which liberate toxic methanol. Along with the liberation of volatile dissociation products (elimination of alcohol), a not inconsiderable shrinkage of the silicone elastomer, which is generally undesirable, is also observed. The alcohol eliminated can also work against good adhesion since the alcohol accumulates at the surface of the silicone and therefore also at the interface to the substrate, as a result of which contact between silicone and substrate surface is reduced. In addition, in the case of functional alkoxysilanes, there is a risk of "efflorescence" and "sweating".

Furthermore, it is known that the addition of particular bonding additives can have an adverse effect on the rheology of silicone compositions. Typical effects are thickening through to setting or complete stiffening of the unvulcanized formulations, which can significantly restrict their fitness for use, in particular for coating, casting or encapsulation processes.

The bonding additives used are frequently only effective under the action of heat, so that a particular minimum vulcanization temperature has to be employed. However, this narrows the possible fields of use of the silicone compositions concerned, in particular when industrial adhesive bonding or lamination processes aim at processing at room temperature.

Owing to their chemical constitution, the additives or crosslinkers used are slightly incompatible with the remaining constituents of the silicone composition and thus accumulate at the phase interface silicone/substrate during vulcanization. However, this thoroughly desirable, intrinsic microphase separation is associated with the silicone compositions in question not being clear and transparent but milky to opaque. Highly transparent, self-adhesive silicone elastomer compositions cannot be obtained in this way.

Some of the additives indicated can, owing to their relatively high reactivity, bring about accelerated SiH degradation, significantly reduce the crosslinking rate or even lead to (irreversible) inhibiting effects. In addition, in many cases the storage-stable production of some very specific bonding agents or bonding agent polymers is very complicated and therefore costly, which ultimately adversely affects the economics.

SUMMARY OF THE INVENTION

The invention provides silicone compositions which can be crosslinked to form elastomers and comprise
(1) organosilicon compounds which have SiC-bonded radicals having aliphatic carbon-carbon multiple bonds and comprise units of the formula $$R_a R^1_b SiO_{(4-a-b)/2} \qquad (I),$$

where
the radicals R can be identical or different and are each an optionally substituted, SiC-bonded, aliphatically saturated hydrocarbon radical, the radicals $R^1$ can be identical or different and are each an optionally substituted, SiC-bonded, aliphatically unsaturated hydrocarbon radical,
a is 0, 1, 2 or 3 and
b is 0, 1, 2 or 3,
with the proviso that the sum a+b is less than or equal to 3 and at least two radicals $R^1$ are present per molecule,
(2) organopolysiloxanes which have Si-bonded hydrogen atoms and comprise units of the formula $$R^2_c H_d SiO_{(4-c-d)/2} \quad (II),$$

where
the radicals $R^2$ can be identical or different and each have one of the meanings given above for R,
c is 0, 1, 2 or 3 and
d is 0, 1 or 2, preferably 0 or 1,
with the proviso that the sum c+d is less than or equal to 3 and there are on average at least three units of the formula (II) with c=d=1 present per molecule, where the content of Si-bonded hydrogen is greater than or equal to 0.7% by weight,
(3) essentially linear organopolysiloxanes having terminally Si-bonded hydrogen atoms and
(4) a catalyst which promotes the addition of Si-bonded hydrogen onto aliphatic multiple bonds,
with the proviso that the molar ratio of Si-bonded hydrogen originating from component (3) and based on 100 parts by weight of composition according to the invention to the sum of the Si-bonded hydrogen originating from the components (2) and (3), in each case based on 100 parts by weight of composition according to the invention, is in the range from 0.05 to 1.

DETAILED DESCRIPTION OF THE PREFERRED EMBODIMENTS

For the purposes of the present invention, the term organopolysiloxanes encompasses polymeric, oligomeric and also dimeric siloxanes in which part of the silicon atoms can also be joined to one another via groups other than oxygen, for instance —C—.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical, dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, and the α- and β-phenylethyl radicals.

Examples of substituted radicals R are hydrocarbon radicals substituted by halogen atoms.

The radicals R are preferably radicals having from 1 to 18 carbon atoms, more preferably those having from 1 to 8 carbon atoms, in particular the methyl radical.

The radicals $R^1$ are preferably hydrocarbon radicals having an aliphatic multiple bond and from 2 to 18 carbon atoms, e.g. vinyl, allyl, methallyl, 2-propenyl, 3-butenyl, 4-pentenyl, 5-hexenyl, butadienyl, hexadienyl, cyclopentenyl, cyclopentadienyl, cyclohexenyl, ethynyl, propargyl and 2-propynyl radicals, with radicals $R^1$ having from 2 to 6 carbon atoms being particularly preferred, in particular the vinyl and allyl radicals.

The organosilicon compounds (1) of the invention can be any aliphatically unsaturated organosilicon compounds which are useful in compositions which can be crosslinked by hydrosilylation, and can be linear, branched or cyclic siloxanes.

The organosilicon compounds (1) are preferably essentially linear oganopolysiloxanes having the structure $$(R^1R_2SiO_{1/2})(R^1RSiO)_{0-50}(R_2SiO)_{0-2000}(R^1R_2SiO_{1/2}),$$

where R and $R^1$ are as defined above.

Although not indicated in the above formula, the linear siloxanes (1) of the invention, can, as a result of the method of preparation, have a molar proportion of branches, i.e. T- and/or Q-units, of up to 1%, preferably up to 1000 ppm.

Examples of linear organosilicon compounds (1) are
(ViMe$_2$SiO$_{1/2}$) (ViMe$_2$SiO$_{1/2}$),
(ViMe$_2$SiO$_{1/2}$) (Me$_2$SiO)$_{110}$(ViMe$_2$SiO$_{1/2}$),
(ViMe$_2$SiO$_{1/2}$) (Me$_2$SiO)$_{160}$(ViMe$_2$SiO$_{1/2}$),
(ViMe$_2$SiO$_{1/2}$) (Me$_2$SiO)$_{210}$(ViMe$_2$SiO$_{1/2}$),
(ViMe$_2$SiO$_{1/2}$) (Me$_2$SiO)$_{440}$(ViMe$_2$SiO$_{1/2}$),
(ViMe$_2$SiO$_{1/2}$) (Me$_2$SiO)$_{620}$(ViMe$_2$SiO$_{1/2}$),
(ViMe$_2$SiO$_{1/2}$) (Me$_2$SiO)$_{1050}$(ViMe$_2$SiO$_{1/2}$),
(ViMe$_2$SiO$_{1/2}$) (Me$_2$SiO)$_{1750}$(ViMe$_2$SiO$_{1/2}$),
(ViMe$_2$SiO$_{1/2}$) (Me$_2$SiO)$_{110}$(ViMeSiO)$_{0.5}$(ViMe$_2$SiO$_{1/2}$),
(ViMe$_2$SiO$_{1/2}$) (Me$_2$SiO)$_{176}$(ViMeSiO)$_{44}$(ViMe$_2$SiO$_{1/2}$),
(ViMe$_2$SiO$_{1/2}$) (Me$_2$SiO)$_{608}$(ViMeSiO)$_{12}$(ViMe$_2$SiO$_{1/2}$),
where Me is a methyl radical and Vi is a vinyl radical.

The linear organosilicon compounds (1) preferably have a viscosity of from 0.5 to $10^6$ mPas, more preferably from 0.5 to 500,000 mPas, and in particular from 0.5 to 100,000 mPas, in each case at 25° C.

Further preferred organosilicon compounds (1) are organopolysiloxane resins, for example those in which the sum a+b is 0 or 1, more preferably 0, in at least 35%, preferably at least 50%, of the units in formula (I).

The organopolysiloxane resins (1) can also have siloxy units (I') having Si-bonded radicals —OR' where R' is a hydrogen atom or a monovalent, optionally substituted hydrocarbon radical, for example Si-bonded hydroxy and alkoxy groups such as methoxy, ethoxy or butoxy radicals, in addition to the units of the formula (I). The siloxy units (I') can be M-, D-, T- or Q-units which can additionally have radicals R and/or $R^1$, where R and $R^1$ each have one of the abovementioned meanings.

The organopolysiloxane resins (1) have, in particular as a result of the method of preparation, a total proportion of Si-bonded radicals —OR', where R' has one of the abovementioned meanings, of preferably <10% by weight, more preferably from 0.01 to 5% by weight.

The organopolysiloxane resins (1) preferably have weight average molecular weights $M_w$ of from 1000 to 100,000 g/mol, more preferably from 1500 to 10,000 g/mol and can be liquid or solid at 25° C. and the pressure of the surrounding atmosphere, i.e. from 900 to 1100 hPa.

If the organopolysiloxane resins (1) are liquid, they preferably have a viscosity of from 20 to 1,000,000 mPas, more preferably from 20 to 500,000 mPas, in each case at 25° C.

If the organopolysiloxane resins are solid, they preferably have a softening temperature of >30° C., more preferably >40° C., and at 23° C. have a density in the range from 0.95 to 2.5 g/cm$^3$, in each case at the pressure of the surrounding atmosphere, i.e. from 900 to 1100 hPa.

Examples of organopolysiloxane resins (1) are silsesquioxanes functionalized with allyl or vinyl groups and also MQ resins functionalized with allyl or vinyl groups and composed essentially of, for example, units of the formulae $(CH_3)_3SiO_{1/2}$—, $R^1(CH_3)_2SiO_{1/2}$— and $SiO_{4/2}$— and optionally also $(R'O)_3SiO_{1/2}$—, $(R'O)_2SiO_{2/2}$— and $(R'O)SiO_{3/2}$—, where the molar proportion of M units $(CH_3)_3SiO_{1/2}$— and $R^1(CH_3)_2SiO_{1/2}$— is from 35 to 65 mol % and the molar proportion of the Q-unit $SiO_{4/2}$— and if present $(R'O)_3SiO_{1/2}$—, $(R'O)_2SiO_{2/2}$— and $(R'O)SiO_{3/2}$— is from 35 to 65 mol %, where $R^1$ is a vinyl or allyl radical.

If the organosilicon compounds (1) are organopolysiloxane resins, preference is given to those which consist essentially of M-units, preferably $R^1R_2SiO_{1/2}$— and $R_3SiO_{1/2}$—, and Q-units, i.e. $SiO_{4/2}$—, and at least 50% of all units in the resin are Q-units, with preference being given to MQ resins functionalized with vinyldimethylsiloxy groups and with particular preference being given to MQ resins which are functionalized with vinyldimethylsiloxy groups and in which the molar proportion of the M units $((CH_3)_3SiO_{1/2}$— and $R^1(CH_3)_2SiO_{1/2}$—) is from 35 to 50 mol % and the molar proportion of Q-units ($SiO_{4/2}$— and if present additionally $(R'O)_3SiO_{1/2}$—, $(R'O)_2SiO_{2/2}$— and $(R'O)SiO_{3/2}$—) is from 50 to 65 mol % and which have a proportion of Si-bonded radicals OR' resulting from the method of preparation of less than 5% by weight.

The organosilicon compounds (1) preferably consist of units of the formula (I) and optionally (I').

The content of aliphatically unsaturated hydrocarbon radicals in the organosilicon compounds (1) used according to the invention is preferably from 0.001 to 1.3 mol of radicals $R^1$, particularly preferably from 0.003 to 1.3 mol, in particular from 0.004 to 1.3 mol, in each case based on 100 g of component (1).

In the case of the linear siloxanes (1), this varies with the chain length and is preferably in the range from 0.001 to 1.3 mol of radicals $R^1$, more preferably from 0.003 to 1.3 mol, in particular from 0.004 to 1.3 mol, and in each case based on 100 g of component (1).

In the case of the organopolysiloxane resins (1), this is preferably in the range from 0.001 to 1.0 mol of radicals $R^1$, more preferably from 0.01 to 0.6 mol, and in particular from 0.02 to 0.1 mol, in each case based on 100 g of component (1).

Component (1) is preferably composed of essentially linear siloxanes or essentially linear siloxanes in a mixture with organopolysiloxane resin, with component (1) most preferably being a mixture of essentially linear siloxanes and organopolysiloxane resins in the mixture (1) of essentially linear siloxanes and organopolysiloxane resins, the proportion by weight of resin is preferably from 0.1 to 80% by weight, more preferably from 10 to 55% by weight.

The organosilicon compounds (1) used according to the invention are commercial products or can be prepared by processes customary in silicon chemistry.

Examples of radicals $R^2$ are the examples given above for R.

The radicals $R^2$ are preferably hydrocarbon radicals having from 1 to 18 carbon atoms, more preferably hydrocarbon radicals having from 1 to 6 carbon atoms, in particular aliphatic hydrocarbon radicals having from 1 to 6 carbon atoms most preferably the methyl radical.

The organosilicon compounds (2) can be any laterally SiH-containing organosiloxanes which are useful in compositions which can be crosslinked by hydrosilylation.

Although not indicated in formula (II), the constituent (2) can have a small content, typically less than 100 ppm by weight, of Si-bonded OH groups as a result of the synthetic routes customary in the prior art and as a result of the inherent lability of SiH groups, in particular at elevated temperatures and/or in the presence of suitable catalysts and reaction partners. The organosilicon compounds (2) preferably consist of units of the formula (II), and are preferably organopolysiloxanes having a viscosity of from 2 to 1000 mPas, more preferably from 10 to 500 mPas, in each case at 25° C.

Examples of organohydrogenpolysiloxanes (2) are linear, branched and cyclic organohydrogenpolysiloxanes which can, for example, be composed of units of the formulae $(CH_3)_3SiO_{1/2}$—, $H(CH_3)SiO_{2/2}$—, $(CH_3)_2SiO_{2/2}$— and $(CH_3)SiO_{3/2}$—.

Examples of branched organopolysiloxanes (2) are siloxanes containing $CH_3SiO_{3/2}$—, $(CH_3)_2SiO_{2/2}$— and $H(CH_3)SiO_{2/2}$— units and having $(CH_3)_3SiO_{1/2}$— end groups.

Preferred examples of cyclic organopolysiloxanes (2) are copolymers containing $H(CH_3)SiO_{2/2}$— and $(CH_3)_2SiO_{2/2}$— units or homopolymers containing exclusively $H(CH_3)SiO_{2/2}$— units, with homopolymers such as pentamethylcyclopentasiloxane $(SiMe(H)O)_5$; $D_5^H$ or hexamethylcyclohexasiloxane $(SiMe(H)O)_6$; $D_6^H$, or heptamethylcycloheptasiloxane $(SiMe(H)O)_7$; $D_7^H$, or octamethylcyclooctasiloxane $(SiMe(H)O)_8$; $D_8^H$, being particularly preferred.

Preferred linear organopolysiloxanes (2) are siloxanes containing $H(CH_3)SiO_{2/2}$— units and having $(CH_3)_3SiO_{1/2}$— end groups,
siloxanes containing $H(CH_3)SiO_{2/2}$— and $(CH_3)_2SiO_{2/2}$— units and having $(CH_3)_3SiO_{1/2}$— end groups,
siloxanes containing $(Et)_2SiO_{2/2}$— and $H(CH_3)SiO_{2/2}$— units and having $(CH_3)_3SiO_{1/2}$— end groups,
siloxanes containing $(Et)_2SiO_{2/2}$—, $(CH_3)_2SiO_{2/2}$— and $H(CH_3)SiO_{2/2}$— units and having $(CH_3)_3SiO_{1/2}$— end groups,
siloxanes containing $(Et)(CH_3)SiO_{2/2}$—, $(CH_3)_2SiO_{2/2}$— and $H(CH_3)SiO_{2/2}$— units and having $(CH_3)_3SiO_{1/2}$— end groups and
siloxanes containing $(Et)(CH_3)SiO_{2/2}$— and $H(CH_3)SiO_{2/2}$— units and having $(CH_3)_3SiO_{1/2}$— end groups where Et is the ethyl radical,
with siloxanes containing $H(CH_3)SiO_{2/2}$— units and having $(CH_3)_3SiO_{1/2}$— end groups and also siloxanes containing $H(CH_3)SiO_{2/2}$— and $(CH_3)_2SiO_{2/2}$—units and having $(CH_3)_3SiO_{1/2}$-end groups, in particular those having a molar ratio of $H(CH_3)SiO_{2/2}$— to $(CH_3)_2SiO_{2/2}$— units of 3-3.5:1 or 0.9-1.1:1, being particularly preferred.

The organopolysiloxanes (2) are preferably linear siloxanes having lateral SiH groups or cyclic siloxanes, with linear siloxanes having the structure

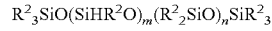

$$R^2{}_3SiO(SiHR^2O)_m(R^2{}_2SiO)_nSiR^2{}_3$$

where $R^2$ is as defined above, m is an integer from 3 to 100 and n is 0 or an integer from 1 to 150, being particularly preferred.

Although not indicated in the above formula, the linear siloxanes (2) can, as a result of the method of preparation, have a molar proportion of branches, i.e. T- and/or Q-units, of up to 1%, preferably up to 1000 ppm.

The organopolysiloxane (2) preferably contains on average from 5 to 60 SiH groups per molecule, and has a content of Si-bonded hydrogen of ≥0.7% by weight, preferably >1% by weight.

The proportion of component (2) is preferably in the range from 1 to 10 parts by weight, particularly preferably from 1 to 5 parts by weight, in each case based on 100 parts by weight of the composition according to the invention.

The organopolysiloxanes (2) used according to the invention are commercial products or can be prepared by processes customary in silicon chemistry.

The organopolysiloxanes (3) used according to the invention are preferably ones of the formula $$R^3_2HSiO(SiR^3_2O)_pSiR^3_2H \qquad (III),$$

where
the radicals $R^3$ can be identical or different and are each an optionally substituted, SiC-bonded, aliphatically saturated hydrocarbon radical and
p is 0 or an integer from 1 to 250.

Examples of radicals $R^3$ are the examples given above for R.

The radicals $R^3$ are preferably aliphatically saturated hydrocarbon radicals having from 1 to 18 carbon atoms, more preferably aliphatically saturated hydrocarbon radicals having from 1 to 6 carbon atoms, and in particular the methyl radical.

Although not indicated in formula (III), the linear siloxanes (3) can, as a result of the method of preparation, have a molar proportion of branches, i.e. T- and/or Q-units, of up to 1%, preferably up to 1000 ppm.

The siloxanes (3) preferably contain units of the formulae $H(CH_3)_2SiO_{1/2}$— and $(CH_3)_2SiO_{2/2}$—, with the disiloxane $H(CH_3)_2SiOSi(CH_3)_2H$ and organopolysiloxanes consisting of units of the formulae $H(CH_3)_2SiO_{1/2}$— and $(CH_3)_2SiO_{2/2}$— being particularly preferred.

Examples of organopolysiloxanes (3) are
$H(CH_3)_2SiOSi(CH_3)_2H$,
$H(CH_3)_2SiO[(CH_3)_2SiO]_8Si(CH_3)_2H$,
$H(CH_3)_2SiO[(CH_3)_2SiO]_{12}Si(CH_3)_2H$,
$H(CH_3)_2SiO[(CH_3)_2SiO]_{15}Si(CH_3)_2H$,
$H(CH_3)_2SiO[(CH_3)_2SiO]_{50}Si(CH_3)_2H$,
$H(CH_3)_2SiO[(CH_3)_2SiO]_{60}Si(CH_3)_2H$ and
$H(CH_3)_2SiO[(CH_3)_2SiO]_{220}Si(CH_3)_2H$.

The siloxanes (3) have a viscosity of preferably from 0.4 to 5000 mPas, more preferably from 2.5 to 1500 mPas, in each case at 25° C.

The organopolysiloxanes (3) used according to the invention are commercial products or can be prepared by processes customary in silicon chemistry.

The proportion of component (3) is preferably in the range from 3 to 60 parts by weight, more preferably from 5 to 50 parts by weight, and in particular from 10 to 50 parts by weight, in each case based on 100 parts by weight of composition according to the invention.

In the compositions of the invention, the ratio of the proportions by weight of the component (3) to the component (2) is preferably in the range from 60:1 to 0.3:1, more preferably from 50:1 to 0.5:1, and in particular from 25:1 to 1:1.

The molar ratio of Si-bonded hydrogen originating from component (3) and based on 100 parts by weight of composition according to the invention to the sum of the Si-bonded hydrogen originating from the components (2) and (3), in each case based on 100 parts by weight of composition according to the invention, is preferably in the range from 0.05 to 1, more preferably from 0.1 to 1, and in particular from 0.2 to 1.

In the compositions of the invention, the molar ratio of the total SiH groups in the components (2) and (3) to Si-bonded radicals having an aliphatic carbon-carbon multiple bond of the component (1) can vary in the range from 0.8 to 15, with a molar ratio of from 1.0 to 5 being preferred and from 1.25 to 3.5 being particularly preferred.

As constituent (4), which promotes the addition reaction (hydrosilylation) between the radicals having an aliphatic carbon-carbon multiple bond and Si-bonded hydrogen, it is possible to use all previously known hydrosilylation catalysts in the compositions of the invention.

As a hydrosilylation catalyst (4), preference is given to using metals of the group of platinum metals, e.g. platinum, rhodium, palladium, ruthenium and iridium, preferably platinum and rhodium, which may be immobilized on finely divided support materials such as activated carbon, metal oxides such as aluminum oxide or silicon dioxide, or a compound or a complex from the group of platinum metals.

Particular preference is given to using platinum and platinum compounds, in particular platinum compounds which are soluble in polyorganosiloxanes, as a catalyst (4). As soluble platinum compounds (4), it is possible to use, for example, the platinum-olefin complexes of the formulae $(PtCl_2.olefin)_2$ and $H(PtCl_3.olefin)$, with preference being given to using alkenes having from 2 to 8 carbon atoms, e.g. ethylene, propylene, isomers of butene and of octene, or cycloalkenes having from 5 to 7 carbon atoms, e.g. cyclopentene, cyclohexene and cycloheptene. Further soluble platinum catalysts are the platinum-cyclopropane complex of the formula $(PtCl_2C_3H_6)_2$, the reaction products of hexachloroplatinic acid with alcohols, ethers and aldehydes or mixtures thereof or the reaction product of hexachloroplatinic acid with methylvinylcyclotetrasiloxane in the presence of sodium bicarbonate in ethanolic solution. Platinum catalysts having phosphorus, sulphur and amine ligands, e.g. $(Ph_3P)_2PtCl_2$, can also be used. Very particular preference is given to complexes of platinum with vinylsiloxanes such as sym-divinyltetramethyldisiloxane.

In a particular embodiment, the platinum catalyst can be present in UV-sensitive form, which makes UV-activated curing of the formulations according to the invention possible. Examples of such catalysts are disclosed in DE 102008000156 A1, page 2, paragraph [0006] to page 3, paragraph [0012] (inclusive), page 3, paragraph [0016] to page 6, paragraph [0025] (inclusive) and also page 6, paragraph [0030] to page 7, paragraph [0031] (inclusive), which are incorporated by reference into the disclosure content of the present invention.

The amount of hydrosilylation catalyst (4) used depends on the desired crosslinking rate and also economic aspects. Typically, preference is given to using from $1\times10^{-5}$ to $5\times10^{-2}$ parts by weight, more preferably from $1\times10^{-4}$ to $1\times10^{-2}$ parts by weight, and in particular from $5\times10^{-4}$ to $5\times10^{-3}$ parts by weight, of platinum catalysts, in each case calculated as platinum metal, per 100 parts by weight of composition according to the invention.

Apart from the components (1) to (4), the compositions of the invention can also comprise all further materials which are useful for producing addition-crosslinkable compositions, with the proviso that the further materials are different from the components (1) to (4).

Thus, the compositions of the invention can contain further constituents such as inhibitors (5), fillers (6), additives (7) and further components (8).

The inhibitors (5) which are optionally used serve to set the processing time, start temperature and crosslinking rate of the compositions of the invention in a targeted way.

Examples of inhibitors (5) are acetylenic alcohols such as 1-ethynyl-1-cyclohexanol, 2-methyl-3-butyn-2-ol and 3,5-dimethyl-1-hexyn-3-ol, 3-methyl-1-dodecyn-3-ol, trialkyl cyanurates, alkyl maleates such as diallyl maleate, dimethyl maleate and diethyl maleate, alkyl fumarates such as diallyl fumarate and diethyl fumarate, organic hydroperoxides such as cumene hydroperoxide, tert-butyl hydroperoxide and pinane hydroperoxide, organic peroxides, organic sulfoxides, organic amines, diamines and amides, phosphates and phosphites, nitriles, triazoles, diaziridines and oximes. The action of these inhibitors (5) depends on their chemical structure, so that it has to be determined individually.

If inhibitors (5) are used in the silicone compositions, they are preferably used in amounts of from 1 to 50,000 ppm, more preferably from 20 to 2000 ppm, and in particular from 100 to 1000 ppm, in each case based on 100 parts by weight of the silicone composition. The compositions of the invention preferably contain inhibitor (5).

In the compositions of the invention, the addition of inhibitor (5) can be omitted or the amount used can be reduced when other constituents of the composition display a certain inhibitor effect.

Examples of fillers (6) which may optionally be used are nonreinforcing fillers, i.e. fillers having a BET surface area of up to 50 $m^2/g$, e.g. quartz, diatomaceous earth, calcium silicate, zirconium silicate, zeolites, metal oxide powders, e.g. aluminum, titanium, iron or zinc oxides or mixtures thereof, barium sulfate, calcium carbonate, gypsum, silicon nitride, silicon carbide, boron nitride, glass powder and polymer powder, e.g. polyacrylonitrile powder; reinforcing fillers, i.e. fillers having a BET surface area of more than 50 $m^2/g$, e.g. pyrogenic silica, precipitated silica, precipitated chalk, carbon black, e.g. furnace black and acetylene black, and silicon-aluminum mixed oxides having a large BET surface area; fibrous fillers such as asbestos and polymer fibers. The fillers mentioned can be hydrophobicized, for example by treatment with organosilanes or organosiloxanes or with stearic acid or by etherification of hydroxyl groups to form alkoxy groups.

Further examples of fillers (6) which may optionally be used are organopolysiloxane resins, which can be any silicone resins, e.g. those containing units of the formula (I) where b=0 and a=0, 1 or 3 and possibly, as a result of the method of preparation, units having hydroxy and/or organyloxy radicals, for example organosilicone resins of the silsesquioxane type which are preferably solid at 25° C. and the pressure of the surrounding atmosphere and MQ resins preferably having bulk densities of from 100 to 1000 $kg/m^3$ and preferably having softening points of >30° C., more preferably >40° C.

If fillers (6) are used, preference is given to precipitated and pyrogenic silicas, quartzes and chalks.

The specific BET surface area of the silicas (6) which may optionally be used is preferably at least 50 $m^2/g$, more preferably from 100 to 400 $m^2/g$.

If fillers (6) are used, they are preferably used in amounts of from 0.1 to 75 parts by weight, more preferably from 1 to 50 parts by weight, in each case based on 100 parts by weight of the composition. In the compositions of the invention, fillers (6) are preferably used when no aliphatically unsaturated silicone resin is used as component (1). However, if an aliphatically unsaturated silicone resin is used as component (1), the addition of filler (6) can be correspondingly reduced or can be omitted entirely, which is particularly preferred for the production of highly transparent encapsulating compositions.

Preferred examples of the additives (7) which are not relevant to adhesion and may optionally be used according to the invention are dispersants, pigments, dyes, fungicides, fragrances, oxidation inhibitors, agents which protect against flames and combustion-retarding agents, rheology regulators, UV stabilizers and heat stabilizers.

If additives (7) are used, they are preferably used in amounts of from 0.0001 to 5 parts by weight, more preferably from 0.01 to 2.5 parts by weight, in each case based on 100 parts by weight of the composition. Preference is given to using no additives (7) for producing the compositions of the invention.

Preferred examples of further components (8) which may optionally be used are organic solvents and also plasticizers such as organic polymers and silicone oils.

If further components (8) are used, they are preferably used in amounts of preferably from 0.1 to 70 parts by weight, more preferably from 1 to 40 parts by weight, in each case based on 100 parts by weight of the composition. Preference is given to using no further components (8) for producing the compositions of the invention.

The compositions of the invention preferably do not contain any further materials beyond the components (1) to (8).

The individual components used in the crosslinkable compositions of the invention can in each case be one type of these components or else a mixture of at least two types of these components.

The density of the compositions of the invention is preferably in the range from 0.8 to 3 $g/cm^3$, more preferably from 0.9 to 1.5 $g/cm^3$, in each case at 23° C. and the pressure of the surrounding atmosphere, i.e. a pressure of from 900 to 1100 hPa.

The organopolysiloxane compositions of the invention can be produced by known methods, for example by mixing the individual components in any order and using any mixing apparatuses.

The present invention further provides a process for producing the composition according to the invention by mixing the individual components in any order.

If the composition of the invention is a 1-component silicone rubber composition, the process of the invention is preferably carried out by mixing organosilicon compound (1) with organo(hydrogen)polysiloxane (3) and subsequently with optional further constituents (6), (7) and (8), the organo(hydrogen)polysiloxane (2) and optionally with inhibitor (5) and the hydrosilylation catalyst (4), with mixing preferably being carried out by means of discontinuous and/or continuous mixing apparatuses, for example kneaders, high-speed mixers or planetary mixers.

If the composition of the invention is an addition-crosslinking 2-component silicone rubber composition, the two components of the composition of the invention can contain all constituents in any combinations and ratios, with the proviso that a component does not simultaneously contain the constituents (2), (3) and (4), in particular not the constituents (1), (2), (3) and (4). Preference is given to one of the two components containing the constituents (1) and (4) and the other component comprising the constituents (2) and (3) and optionally further (1).

If the composition of the invention is a 2-component silicone rubber composition, the process of the invention for producing the first mixing component (e.g. referred to as component X) is preferably carried out by mixing organosilicon compound (1) with optionally filler (6), optionally inhibitor (5), optionally further constituents (7) and (8) and the hydrosilylation catalyst (4), with mixing preferably being carried out by means of discontinuous and/or continuous mixing apparatuses such as kneaders, high-speed mixers or planetary mixers. To produce the second mixing component according to the invention (e.g. referred to as component Y), preference is given to mixing optionally further organosilicon compound (1) with the organo(hydrogen)polysiloxanes (2) and (3) and optionally further constituents (5), (6), (7) and (8), with in this case, too, mixing preferably being carried out by means of discontinuous and/or continuous mixing apparatuses such as kneaders, high-speed mixers or planetary mixers.

In a further preferred variant of the process of the invention, the constituent (1) is, if constituent (1) and constituent (2) are present in the same component, always firstly "diluted" with all other constituents (where present) apart from the components (2), (4) and optionally (5) and only then are the components (2), (4) and optionally (5) added. This procedure is of particular advantage when component (1) is at least partly made up of organopolysiloxane resins.

In a preferred process variant, the constituents (1) to (8) are divided between two components (X) and (Y). The mixing ratio of component (X) to component (Y) can be from 100:1 to 1:100. Preference is given to mixing ratios of from 20:1 to 1:20, in particular mixing ratios of from 15:1 to 1:15.

The process of the invention can be carried out continuously or batchwise.

The process of the invention is preferably carried out at a temperature in the range from −20 to +100° C., more preferably in the range from 0 to +80° C., and in particular from +10 to +60° C. Furthermore, the process of the invention is preferably carried out at the pressure of the surrounding atmosphere, i.e. a pressure of from 900 to 1100 hPa.

The process of the invention can be carried out with exclusion of moisture, or under a protective gas atmosphere, but this is not preferred.

If component (4) in the compositions of the invention is a UV-sensitive catalyst, the process of the invention is preferably carried out in the absence of light, in particular in the absence of UV light, i.e. light having a wavelength of from 1 to 550 nm.

The inventive compositions which can be crosslinked by addition of Si-bonded hydrogen onto an aliphatic multiple bond can be left to crosslink under the same conditions as the previously known compositions which can be crosslinked by a hydrosilylation reaction.

The crosslinking of the self-adhesive silicone compositions which can be crosslinked to form elastomers with simultaneous increase in adhesion is preferably carried out at temperatures of from −30 to +80° C., more preferably from 0 to +60° C., and most preferably from +10 to +30° C., in particular at room temperature, i.e. 23° C. However, curing can also be carried out at other temperatures, for example by heating up to 250° C., but this is not preferred.

If the composition of the invention is an addition-crosslinking 2-component silicone rubber composition, the pot life (open processing time) is not more than 24 hours, preferably not more than 6 hours, more preferably not more than 120 minutes, based on room temperature (23° C.) and 50% relative atmospheric humidity.

In a particular embodiment, the crosslinking of the self-adhesive silicone compositions which can be crosslinked to form elastomers with simultaneous increase in adhesion is carried out by UV activation as described in DE 102008000156 A1. Here, the composition according to the invention which has been applied in the appropriate way is preferably illuminated for at least 0.1 s, preferably at least 2 s, up to a maximum of 2 minutes, preferably a maximum of 1 minute, with UV light having a wavelength range from 230 to 400 nm, as can be generated, for example, by means of an iron lamp, at an irradiation intensity of preferably at least 25 mW/cm², preferably from 70 to 150 mW/cm². The crosslinking time is dependent on the intensity of the UV radiation and the duration of UV irradiation. The UV radiation sources used are commercial products and can be procured from sources known to those skilled in the art.

The invention further provides moldings produced by crosslinking the compositions of the invention.

The moldings of the invention are milky to transparent, but preferably transparent.

The moldings of the invention can be any elastomers such as seals, pressed articles, extruded profiles, coatings, impregnations, encapsulation, lenses, Fresnel lenses, prisms, polygonal structures, laminate layers or adhesive layers.

If the moldings of the invention are transparent moldings, these preferably have a transmission of >80% at wavelengths of >300 nm, more preferably >85% at 300 nm, >90% at 400 nm and >92% at 500-800 nm, in each case based on a layer thickness of 2 mm and measured in accordance with DIN 5036, part 3, chapter 6.3.1, in transmission relative to air.

The moldings of the invention are elastomers having a Shore A hardness preferably >5, more preferably >10, and in particular from 20 to 60, in each case measured in accordance with DIN 53505-A (23° C., test specimen having a thickness of 6 mm).

The density of the moldings of the invention is preferably in the range from 0.8 to 3 g/cm³, more preferably from 1 to 1.5 g/cm³, in each case at 23° C. and the pressure of the surrounding atmosphere, i.e. a pressure of from 900 to 1100 hPa.

The moldings of the invention preferably have cone penetration values of <100 1/10 mm, more preferably <60 1/10 mm, and in particular <25 1/10 mm, most preferably from 0 to 20 1/10 mm, in each case measured by means of a penetrometer in accordance with DIN ISO 2137 using a 150 g standard cone (including movable accoutrements such as falling rod), as described in DIN ISO 2137 (1997-08 edition) in section 4.2.1 and FIG. 3, on test specimens produced by vulcanization for 1 hour at 100° C. in a convection oven.

The moldings of the invention preferably have an extractable constituent comprising the organosilicon compounds (1), (2) and (3), of preferably <5% by weight, more preferably <2.5% by weight, and in particular <1% by weight. To determine the extractable constituents, 2 g of the composition according to the invention are vulcanized for 1 hour at 150° C., then shaken with 35 ml of heptane for 24 hours using an overhead shaker, the heptane is discarded and the silicone residue is dried to constant weight at 150° C.; the weight difference from the initial weight before addition of the heptane is the proportion of extractable constituents.

The moldings of the invention require an indentation force, i.e. the force which the measuring machine has to exert in order to be able to push the measuring probe into the test specimen to a prescribed extent, of preferably >0.5 N, more preferably >1 N, yet more preferably >3 N, and most preferably >4 N, in each case based on a cylindrical test specimen having a thickness of at least 10 mm, a diameter of 25 mm and measured in accordance with the method described below.

The test specimens preferably have a low surface tack. The moment required to detach the measuring probe from the test specimen is preferably from −1.2 to 0 N·mm, more preferably from −1 to 0 N·mm, and in particular from −0.5 to 0 N·mm, in each case based on a cylindrical test specimen having a thickness of at least 10 mm, a diameter of 25 mm and measured in accordance with the method described below.

The displacement difference which can be measured in the determination of the surface tack of the moldings until the measurement probe detaches from the test specimen surface is preferably <3 mm, more preferably <1 mm, and in particular from 0 to 0.5 mm, in each case based on a cylindrical test specimen having a thickness of at least 10 mm, a diameter of 25 mm and measured in accordance with the method described below.

The indentation force, displacement difference and surface tack are determined as follows, e.g. by means of a Texture Analyzer (Model: TA HDi Texture Analyser, Stable Micro Systems Ltd, Godalming, UK): a standardized measuring probe (cylindrical penetration punch made of stainless steel and having a diameter of 4 mm, commercially available under the model designation P/4 from Stable Micro Systems Ltd, Godalming, UK) is pressed centrally to a prescribed displacement (1 mm) at a velocity of 1 mm/s vertically into the test specimen which is located in a cylindrical aluminum crucible having a height of 18 mm and an internal diameter of 25 mm (the test specimen is a vulcanizate having a minimum height of from 10 mm to 18 mm and is produced by vulcanization for 14 days at room temperature, 50% relative atmospheric humidity and atmospheric pressure directly in the aluminum crucible) and held in this position for 60 s. After this relaxation time, the measuring probe is withdrawn vertically at a velocity of 2 mm/s until complete detachment from the test specimen surface occurs. The forces acting on the measuring probe during these events are recorded and evaluated as a force-time graph. The peak force during pressing of the measuring probe into the test specimen before commencement of the relaxation time corresponds to the indentation force; this is reported with a positive unit. The negative force peak during detachment of the measuring probe from the test specimen surface is the adhesive force, with the surface tack being defined as the area in the force-time graph enclosed by the force-time curve during the detachment process in the negative force range until complete detachment of the measuring probe from the test specimen surface occurs. Furthermore, the displacement of the measuring probe in the negative force range until complete detachment from the test specimen surface occurs is the abovementioned displacement difference.

The moldings of the invention preferably display a loss factor at 1 Hz and 23° C. of <0.5, more preferably <0.3, and in particular <0.2, in each case measured by means of dynamic mechanical analysis (DMA) in accordance with ISO 6721-1 and -4.

The moldings of the invention have a hardness Sh 00 of preferably >20, more preferably >45, and in particular from 70 to 95, in each case measured in accordance with ASTM D 2240 (23° C., test specimen having a thickness of 6 mm).

The moldings of the invention can also be material composites in which at least part of the composite consists of a silicone elastomer which has been produced from the silicone compositions according to the invention and is firmly joined to at least one substrate material.

The invention further provides a process for producing material composites, in which the silicone composition of the invention is applied to at least one substrate and subsequently allowed to crosslink.

Examples are coatings, encapsulation, the production of shaped articles, composites and composite moldings. For the present purposes a composite molding is a uniform shaped article made of a composite composed of a silicone elastomer part produced from the silicone compositions of the invention and at least one substrate in such a way that a strong, durable bond exists between the two parts.

In the process of the invention for producing material composites, the silicone composition of the invention can also be vulcanized between at least two identical or different substrates, for example in the case of adhesive bonds, laminates or encapsulations.

The self-adhesive silicone compositions of the invention can, in particular, be advantageously used wherever good adhesive strength between the addition-crosslinking silicone elastomer and at least one substrate, preferably consisting of organic polymers, metals, metal alloys, organic and inorganic glasses, ceramics, glass-ceramics and enamels, is desired. The substrates are preferably metals, metal alloys, inorganic glasses, ceramics, glass-ceramics and enamels. Particular preference is given to aluminum materials, steel materials, inorganic glasses, glass-ceramics and enamels. The substrate can be present as a molding, film or coating.

The self-adhesive, addition-crosslinking silicone compositions of the invention are suitable for producing material composites by coating, adhesive bonding and casting and also for producing substrate-supported shaped articles by casting, encapsulation, injection molding, extrusion and molding processes.

The self-adhesive, addition-crosslinking silicone compositions of the invention are suitable for many artistic and industrial applications, for example in the field of the electric, electronics, household appliance, consumer goods, construction, glass, automobile, photovoltaics or optics industries, in medical technology, in the production of sports and leisure articles, in the field of transport, etc. Examples are coating of woven textiles and textile sheets; coating of metallic materials, glasses, glass-ceramics, ceramics, enamels and photovoltaic cells; coating or encapsulation of electric and electronic components; encapsulation of solar cells; joining and adhesive bonding of optical components; production of glass-supported optical components, lamination of solar modules, and adhesive bonding and lamination in the artistic glass-working field.

The compositions of the invention preferably lead to self-adhesion during vulcanization at room temperature (23° C.) within 7 days, more preferably 3 days, and in particular within 24 hours.

The compositions of the invention have the advantage that they are simple to produce and are free of conventional bonding agents, and have the further advantage that they have good storage stability and, where required, flowability. The compositions of the invention also have the advantage that they have a high crosslinking rate even at low temperatures.

Furthermore, the compositions of the invention have the advantage that they have a high level of use properties such as transparency, resistance to corrosion and simple use, and the further advantages that mechanically strong, optionally also highly transparent, material composites for industrial applications can be produced therefrom in a satisfactory manner at room temperature.

The compositions of the invention also have the advantage that moldings produced therefrom have a high adhesive strength on the selected substrates, with adhesion building up even at room temperature, and also very good hydrolysis resistance at elevated temperatures.

Surprisingly, it is only the combination of the SiH-containing siloxane (2) with the SiH-terminal organopolysiloxane (3) which leads, even in the absence of the bonding agents known from the literature, to the desired excellent self-adhesion on various substrate materials. As a result, it is possible to obtain highly transparent (because they are bonding agent-free) material composites which can also be produced even at room temperature.

The self-adhesive, addition-crosslinking silicone compositions of the invention also have the following advantages:
  the rheological properties and the flowability of the uncrosslinked silicone compositions can be chosen freely since any bonding agent additives which have an adverse effect on the rheology are not present;
  the crosslinking rate (and thus vulcanization characteristics) can be set at will by means of the inhibitor content;
  the crosslinked elastomers have a high adhesive strength on metallic materials, inorganic glasses, glass-ceramics, ceramics and enamels, the crosslinked elastomers have excellent transparency in the case of appropriately formulated silicone compositions, no liberation of toxic dissociation products or volatile constituents during crosslinking which have an adverse effect on the shrinkage.

In the following examples, all parts and percentages are, unless indicated otherwise, by weight. Unless indicated otherwise, the following examples are carried out at the pressure of the surrounding atmosphere, i.e. at about 1000 hPa, and at room temperature, i.e. about 23° C., or a temperature which is established on combining the reactants at room temperature without additional heating or cooling. All viscosities mentioned in the examples relate to a temperature of 25° C.

The ultimate tensile strength is determined in accordance with DIN 53504-S1.

The elongation at break is determined in accordance with DIN 53504-S1.

The Shore A hardness is determined in accordance with DIN (Deutsche Industrie Norm) 53505-A (August 2000 edition).

Comparative Example 1 (C1)

A two-component silicone which is commercially available from Wacker Chemie AG, Munich, under the trade name ELASTOSIL® RT 601A/B serves as comparison. The mixing ratio of A component to B component is 9:1 (by weight). The mixture is degassed for 2 minutes at a pressure of 5 mbar and subsequently poured into a stainless steel mold having a depression (surface: high-gloss, polished) of the dimensions 200 mm×300 mm×2 mm, with the inner surfaces having been treated beforehand with a water-based mold release agent (commercially available under the trade name ELASTOSIL® AUX FORMTRENNMITTEL 32 from Wacker Chemie AG, Munich). The mixture is allowed to vulcanize at room temperature for 24 hours, the silicone elastomer sheet is removed from the mold and is allowed to condition for a further 7 days under standard conditions (23° C., 50% relative atmospheric humidity). This gives a highly transparent, elastomeric vulcanizate of medium hardness. Typical fields of use of this encapsulating composition are, for example, the field of laminated glass and construction of optical apparatuses.

The results on the materials properties may be found in tables 1 and 2.

Comparative Example 2 (C2)

A two-component silicone which is commercially available from Wacker Chemie AG, Munich, under the trade name ELASTOSIL® RT 604 A/B serves as comparison. The mixing ratio of A component to B component is 9:1 (by weight). The mixture is degassed for 2 minutes at a pressure of 5 mbar and subsequently poured into a stainless steel mold having a depression (surface: high-gloss, polished) of the dimensions 200 mm×300 mm×2 mm, with the inner surfaces having been treated beforehand with a water-based mold release agent (commercially available under the trade name ELASTOSIL® AUX FORMTRENNMITTEL 32 from Wacker Chemie AG, Munich). The mixture is allowed to vulcanize at room temperature for 24 hours, the silicone elastomer sheet is removed from the mold and is allowed to condition for a further 7 days under standard conditions (23° C., 50% relative atmospheric humidity). This gives a highly transparent, elastomeric vulcanizate of low hardness. Typical fields of use of this encapsulating composition are, for example, the field of laminated glass, construction of optical apparatuses and also lamination and encapsulation of photovoltaic modules.

The results on the materials properties may be found in tables 1 and 2.

Example 1

Production of the A Component 99.7 g of a silicone resin-based basic composition consisting of 49.85 g of an MQ resin partially functionalized with vinyldimethylsiloxy groups and having a vinyl content of 0.65 mmol/g, a weight average molecular weight $M_W$ of about 5300 g/mol and a molar M/Q ratio of 42:58 and 49.85 g of a vinyldimethylsiloxy-terminated polydimethylsiloxane having a viscosity of 20,000 mPas (25° C.) are mixed with 0.3 g of a catalyst solution having a Pt content of 1% by weight and containing a platinum-divinyltetramethyldisiloxane complex dissolved in vinyldimethylsiloxy-terminated polydimethylsiloxane having a viscosity of 1000 mPas (25° C.)

Production of the B Component 32.3 g of a vinyldimethylsiloxy-terminated polydimethylsiloxane having a viscosity of 1000 mPas (25° C.) are mixed with 61.25 g of a hydrogendimethylsiloxy-terminated polydimethylsiloxane having a viscosity of 1000 mPas (25° C.), 6.1 g of a trimethylsiloxy-end capped copolymer consisting of dimethylsiloxy and methylhydrogensiloxy units in a molar ratio of 1:3 and having a viscosity of 40 mPas and an Si—H content of 1.1% and also 0.15 g of an inhibitor solution consisting of ethynylcyclohexanol dissolved in vinyldimethylsiloxy-terminated polydimethylsiloxane having a viscosity of 1000 mPas (25° C.) and 0.2 g of divinyltetramethyldisiloxane.

The components A and B are mixed with one another in a mixing ratio of A component to B component of 1:1 (by weight). The mixture is degassed for 2 minutes at a pressure of 5 mbar and subsequently poured into a stainless steel mold having a depression (surface: high-gloss, polished) of the dimensions 200 mm×300 mm×2 mm, with the inner surfaces having been treated beforehand with a water-based mold release agent (commercially available under the trade name ELASTOSIL® AUX FORMTRENNMITTEL 32 from Wacker Chemie AG, Munich). The mixture is allowed to vulcanize at room temperature for 24 hours, the silicone elastomer sheet is removed from the mold and is allowed to condition for a further 7 days under standard conditions (23° C., 50% relative atmospheric humidity).

The results on the materials properties may be found in tables 1 and 2.

Example 2

Production of the A Component 53.7 g of a silicone resin-based basic composition consisting of 26.85 g of an MQ resin partially functionalized with vinyldimethylsiloxy groups and having a vinyl content of 0.65 mmol/g, a weight average molecular weight $M_W$ of about 5300 g/mol and a molar M/Q ratio of 42:58 and 26.85 g of a vinyldimethylsiloxy-terminated polydimethylsiloxane having a viscosity of 20,000 mPas (25° C.) are mixed with 46.0 g of a silicone resin-based basic composition consisting of 23 g of an MQ resin partially functionalized with vinyldimethylsiloxy groups and having a vinyl content of 0.65 mmol/g, a weight average molecular weight $M_W$ of about 5300 g/mol and a molar MQ ratio of 42:58 and 23 g of a vinyldimethylsiloxy-terminated polydimethylsiloxane having a viscosity of 1000 mPas (25° C.) and also 0.3 g of a catalyst solution having a Pt content of 1% by weight and containing a platinum-divinyltetramethyldisiloxane complex dissolved in vinyldimethylsiloxy-terminated polydimethylsiloxane having a viscosity of 1000 mPas (25° C.)

Production of the B Component 4.45 g of a vinyldimethylsiloxy-terminated polydimethylsiloxane having a viscosity of 100,000 mPas (25° C.) are mixed with 27.81 g of a vinyldimethylsiloxy-terminated polydimethylsiloxane having a viscosity of 1000 mPas (25° C.), 61.3 g of a hydrogendimethylsiloxy-terminated polydimethylsiloxane having a viscosity of 1000 mPas (25° C.), 6.1 g of a trimethylsiloxy-end capped copolymer consisting of dimethylsiloxy and methylhydrogensiloxy units in a molar ratio of 1:3 and having a viscosity of 40 mPas and an Si—H content of 1.1% and also 0.14 g of an inhibitor solution consisting of ethynylcyclohexanol dissolved in vinyldimethylsiloxy-terminated polydimethylsiloxane having a viscosity of 1000 mPas (25° C.) and 0.2 g of divinyltetramethyldisiloxane.

The components A and B are mixed with one another in a mixing ratio of A component to B component of 1:1 (by weight), and then vulcanized as described under example 1.

The results on the materials properties may be found in tables 1 and 2.

Example 3

Production of the A Component 61.7 g of a silicone resin-based basic composition consisting of 30.85 g of an MQ resin partially functionalized with vinyldimethylsiloxy groups and having a vinyl content of 0.65 mmol/g, a weight average molecular weight $M_W$ of about 5300 g/mol and a molar M/Q ratio of 42:58 and 30.85 g of a vinyldimethylsiloxy-terminated polydimethylsiloxane having a viscosity of 20,000 mPas (25° C.) are mixed with 30.25 g of a vinyldimethylsiloxy-terminated polydimethylsiloxane having a viscosity of 1000 mPas (25° C.) and 0.07 g of divinyltetramethyldisiloxane. 4.35 g of a hydrogendimethylsiloxy-terminated polydimethylsiloxane having a viscosity of 3.5 mPas (25° C.) and subsequently 3.63 g of a trimethylsiloxy-end capped copolymer consisting of dimethylsiloxy and methylhydrogensiloxy units in a molar ratio of 1:3 and having a viscosity of 40 mPas and an Si—H content of 1.1% are then added while stirring and the mixture is homogenized.

Production of the B Component 99.5 g of a vinyldimethylsiloxy-terminated polydimethylsiloxane having a viscosity of 1000 mPas (25° C.) are mixed with 0.5 g of a catalyst solution having a Pt content of 1% by weight and containing a platinum divinyltetramethyldisiloxane complex dissolved in vinyldimethylsiloxy-terminated polydimethylsiloxane having a viscosity of 1000 mPas (25° C.)

The components A and B are mixed with one another, with the mixing ratio of A component to B component being 9:1 (by weight), and then vulcanized as described under example 1.

The results on the materials properties may be found in tables 1 and 2.

Example 4

Production of the A Component 52.75 g of a silicone resin-based basic composition consisting of 26.38 g of an MQ resin partially functionalized with vinyldimethylsiloxy groups and having a vinyl content of 0.65 mmol/g, a weight average molecular weight $M_W$ of about 5300 g/mol and a molar M/Q ratio of 42:58 and 26.37 g of a vinyldimethylsiloxy-terminated polydimethylsiloxane having a viscosity of 20,000 mPas (25° C.) are mixed with 24.25 g of a vinyldimethylsiloxy-terminated polydimethylsiloxane having a viscosity of 1000 mPas (25° C.) and 0.05 g of divinyltetramethyldisiloxane. 19.6 g of a hydrogendimethylsiloxy-terminated polydimethylsiloxane having a viscosity of 60 mPas (25° C.) and also 3.35 g of a trimethylsiloxy-end capped copolymer consisting of dimethylsiloxy and methylhydrogensiloxy units in a molar ratio of 1:3 and having a viscosity of 40 mPas and an Si—H content of 1.1% are then added while stirring and the mixture is homogenized.

Production of the B Component 99.5 g of a vinyldimethylsiloxy-terminated polydimethylsiloxane having a viscosity of 1000 mPas (25° C.) are mixed with 0.5 g of a catalyst solution having a Pt content of 1% by weight and containing a platinum-divinyltetramethyldisiloxane complex dissolved in vinyldimethylsiloxy-terminated polydimethylsiloxane having a viscosity of 1000 mPas (25° C.)

The components A and B are mixed with one another in a mixing ratio of A component to B component of 9:1 (by weight), and then vulcanized as described under example 1.

The results on the materials properties may be found in tables 1 and 2.

Example 5

Production of the A Component 79.8 g of a silicone resin-based basic composition consisting of 39.9 g of an MQ resin partially functionalized with vinyldimethylsiloxy groups and having a vinyl content of 0.65 mmol/g, a weight average molecular weight $M_W$ of about 5300 g/mol and a molar M/Q ratio of 42:58 and 39.9 g of a vinyldimethylsiloxy-terminated polydimethylsiloxane having a viscosity of 20,000 mPas (25° C.) are mixed with 20.0 g of a vinyldimethylsiloxy-terminated polydimethylsiloxane having a viscosity of 1000 mPas (25° C.), 0.1 g of divinyltetramethyl-disiloxane and also 0.1 g of a catalyst solution while a Pt content of 1% by weight and containing a platinum-divinyltetramethyldisiloxane complex dissolved in vinyldimethylsiloxy-terminated polydimethylsiloxane having a viscosity of 1000 mPas (25° C.)

Production of the B Component 22.10 g of a silicone resin-based basic composition consisting of 11.05 g of an MQ resin partially functionalized with vinyldimethylsiloxy groups and having a vinyl content of 0.65 mmol/g, a weight average molecular weight $M_W$ of about 5300 g/mol and a molar M/Q ratio of 42:58 and 11.05 g of a vinyldimethylsiloxy-terminated polydimethylsiloxane having a viscosity of 20,000 mPas (25° C.) are mixed with 48.2 g of a vinyldimethylsiloxy-terminated polydimethylsiloxane having a viscosity of 1000 mPas (25° C.). 6.3 g of a hydrogendimethylsiloxy-terminated polydimethylsiloxane having a viscosity of 60 mPas (25° C.), 15.8 g of a hydrogendimethylsiloxy-terminated polydimethylsiloxane having a viscosity of 1000 mPas (25° C.) and also 7.6 g of a trimethylsiloxy-end capped copolymer consisting of dimethylsiloxy and methylhydrogensiloxy units in a molar ratio of 1:3 and having a viscosity of 40 mPas and an Si—H content of 1.1% are subsequently added and the mixture is homogenized.

The components A and B are mixed with one another in a mixing ratio of A component:B component of 1:1 (by weight), and then vulcanized as described under example 1.

The results on the materials properties may be found in tables 1 and 2.

Example 6

Production of the A Component 54.55 g of a basic composition consisting of 38.19 g of a vinyldimethylsiloxy-terminated polydimethylsiloxane (viscosity:20,000 mPas/25° C.) and 16.36 g of a hydrophobic pyrogenic silica having a specific BET surface area of 300 $m^2/g$ and a carbon content of from 3.9 to 4.2% by weight (commercially available under the trade name "HDK® H30" from Wacker Chemie AG, Munich) and also 27.27 g of a silicone resin-based basic composition consisting of 13.64 g of an MQ resin partially functionalized with vinyldimethylsiloxy groups and having a vinyl content of 0.65 mmol/g, a weight average molecular weight $M_W$ of about 5300 g/mol and a molar M/Q ratio of 42:58 and 13.63 g of a vinyldimethylsiloxy-terminated polydimethylsiloxane having a viscosity of 20,000 mPas (25° C.) are mixed while stirring with 17.53 g of a vinyldimethylsiloxy-terminated polydimethylsiloxane having a viscosity of 1000 mPas (25° C.), 0.55 g of divinyltetramethyldisiloxane and 0.11 g of a catalyst solution having a Pt content of 1% by weight and containing a platinum-divinyltetramethyldisiloxane complex dissolved in the silicone polymer vinyldimethylsiloxy-terminated polydimethylsiloxane having a viscosity of 1000 mPas (25° C.)

Production of the B Component 54.55 g of a basic composition consisting of 24.55 g of a vinyldimethylsiloxy-terminated polydimethylsiloxane (viscosity: 1000 mPas/25° C.), 15 g of a hydrogendimethylsiloxy-terminated polydimethylsiloxane (viscosity: 1000 mPas/25° C.) and 15 g of a hydrophobic pyrogenic silica having a specific BET surface area of 300 $m^2/g$ and a carbon content of from 3.9 to 4.2% by weight (commercially available under the trade name "HDK® H30" from Wacker Chemie AG, Munich) are mixed with 27.27 g of a silicone resin-based basic composition consisting of 13.64 g of an MQ resin partially functionalized with vinyldimethylsiloxy groups and having a vinyl content of 0.65 mmol/g, a weight average molecular weight $M_W$ of about 5300 g/mol and a molar M/Q ratio of 42:58 and 13.63 g of a vinyldimethylsiloxy-terminated polydimethylsiloxane having a viscosity of 20,000 mPas (25° C.) to give a uniform compound. 10.91 g of a hydrogendimethylsiloxy-terminated polydimethylsiloxane having a viscosity of 75 mPas (25° C.) and 3.64 g of a hydrogendimethylsiloxy-terminated polydimethylsiloxane having a viscosity of 3.5 mPas (25° C.) are added while stirring. Finally, 3.64 g of a trimethylsiloxy-end capped copolymer consisting of dimethylsiloxy and methylhydrogensiloxy units in a molar ratio of 1:3 and having a viscosity of 40 mPas and an Si—H content of 1.1% are added and the mixture is well homogenized again.

The components A and B are mixed with one another, with the mixing ratio of A component to B component being 1:1 (by weight), and then vulcanized as described under example 1.

The results on the materials properties may be found in tables 1 and 2.

TABLE 1

Materials properties of the uncrosslinked compositions

| Example | Viscosity of the A component [mPas] | Viscosity of the B component [mPas] | Viscosity of the mixture [mPas] |
|---------|------|------|------|
| C1 | 5000 | 40 | 3500 |
| C2 | 1000 | 200 | 800 |
| 1 | 42,000 | 850 | 3500 |
| 2 | 30,000 | 1100 | 3000 |
| 3 | 900 | 1000 | 920 |
| 4 | 1550 | 1000 | 1350 |
| 5 | 4900 | 800 | 1250 |
| 6 | 55,000 | 9800 | 33 600 |

TABLE 2

Materials properties of the vulcanizates

| Example | Shore A hardness | Ultimate tensile strength [N/mm$^2$] | Elongation at break [%] |
|---------|------|------|------|
| C1 | 45 | 7.0 | 100 |
| C2 | 25 | 1.5 | 100 |
| 1 | 30 | 3.5 | 170 |
| 2 | 30 | 3.7 | 150 |
| 3 | 37 | 4.8 | 210 |
| 4 | 30 | 3.1 | 180 |
| 5 | 38 | 3.8 | 130 |
| 6 | 26 | 3.2 | 310 |

Example 7

Qualitative Adhesion

The compositions described above in the examples are mixed with one another in the mixing ratio of A component to B component indicated in each case and briefly evacuated (1 min., 5 mbar) to remove any enclosed air. The reactive mixtures obtained in this way are applied to the substrates indicated in table 3 by means of a doctor blade in a thickness of about 0.5 mm, allowed to vulcanize at room temperature and, after the time indicated (maintained at room temperature and 50% relative humidity), tested qualitatively by peeling for adhesion and tendancy to delaminate. For this purpose, an about 1 cm deep cut running as close as possible to the substrate surface is made between silicone elastomer and substrate by means of a knife. A spatula is then pushed between the substrate surface and the cut part of the silicone elastomer and shearing off of the vulcanizate adhering to the substrate is then tested by means of the spatula to determine the quality of adhesion; in addition, the nature of the fracture is assessed qualitatively (adhesion failure or cohesive fracture).

TABLE 3

Qualitative adhesion after 1 day/3 days

| Example | Window glass | CERAN ® glass-ceramic plate | Aluminum | Steel | Brass |
|---------|--------------|------------------------------|----------|-------|-------|
| C1 | −/− | −/− | −/− | −/− | −/− |
| C2 | −/− | −/− | −/− | −/− | −/− |
| 1 | +/+ | +/+ | +/+ | +/+ | −/+ |
| 2 | +/+ | +/+ | +/+ | +/+ | −/+ |
| 3 | +/+ | +/+ | +/+ | +/+ | −/+ |
| 4 | +/+ | +/+ | +/+ | +/+ | −/+ |
| 5 | +/+ | +/+ | +/+ | +/+ | −/+ |
| 6 | +/+ | +/+ | +/+ | +/+ | −/+ |

+: good adhesion; the vulcanizate can be removed from the substrate only with cohesive fracture;
−: no adhesion; the vulcanizate can be removed from the substrate over the full area with adhesion failure and without application of force.

Example 8

Quantitative Adhesion

The compositions described above in the examples are mixed with one another in the mixing ratio of A component to B component indicated in each case and briefly evacuated (2 min., 5 mbar) to remove any enclosed air. The reactive mixtures obtained in this way are then immediately applied to separate glass plates (window glass, 70 mm×90 mm×3.0 mm) in such a way that a circular spot having a diameter of about 15 to 20 mm is obtained. A small aluminum cube (edge length: 10 mm×10 mm×10 mm) whose end face to be adhesively bonded has been pretreated with a primer (obtainable under the name WACKER® GRUNDIERUNG G790 from Wacker Chemie AG, Munich) is subsequently placed thereon precisely to 0.5 mm by means of a spacer, with the space between glass and cube being completely filled with crosslinkable composition, and the assembly is allowed to vulcanize at room temperature for 7 days.

The quantitative determination of the adhesion is carried out by means of a texture analyzer (model: TA HDi Texture Analyser, Stable Micro Systems Ltd, Godalming, UK). For this purpose, the aluminum cube is pulled off vertically from the glass plate at a defined pulling-off velocity (2 mm/s) and the force required for separating the aluminum/silicone/glass composite is measured. In addition, the fracture surface was qualitatively examined visually (cohesive fracture in the silicone or adhesion failure at one of the adhesively bonded surfaces). The results are shown in table 4.

TABLE 4

Quantitative determination of the adhesion to glass (adh.: loss of adhesion on the glass side; coh.: cohesive fracture in the silicone layer)

|  | Adhesion [N/mm²] | Comment |
|---|------------------|---------|
| Comparative example 1 | 0.2 | adh. |
| Comparative example 2 | 0.2 | adh. |
| Example 1 | 2.7 | coh. |
| Example 2 | 2.1 | coh. |
| Example 3 | 1.3 | coh. |
| Example 4 | 2.1 | coh. |
| Example 5 | 2.8 | coh. |
| Example 6 | 2.1 | coh. |

Example 9

Tensile Shear Strength of a Glass-Glass Composite

The tensile shear strength is measured by a method based on DIN EN 1465. The test specimens used consist of two glass plates (window glass, 85 mm×25 mm×3.8 mm) which have been joined so as to be parallel and fixed at a spacing of 0.5 mm by means of spacers and have an overlap of 12 mm, so that an adhesion area of 300 mm² is obtained between the two glass plates.

The compositions described above in the examples are mixed with one another in the mixing ratio of A component to B component indicated in each case and briefly evacuated (2 min., 5 mbar) to remove any enclosed air. The reactive mixtures obtained in this way are subsequently introduced by means of a pipette with avoidance of air inclusions into the intermediate space between the two glass plates.

As a modification to this procedure, in example 6 the reactive mixture is firstly applied to one side of one of the two glass plates and this is then, after application of the spacers, joined to the second glass plate with avoidance of any air inclusions in such a way that the intermediate space is completely filled.

The assemblies are allowed to vulcanize at room temperature for 3 days and, after the indicated time, the specimens are quantitatively tested to determine the tensile shear strength (Zwick UPM 144503 tensile testing machine, test speed: 10 mm/min). The results are shown in table 5. While the compositions of examples 1 to 6 without exception display cohesive failure, the measurement in the case of comparative examples 1 and 2 led to adhesion failure over the full area.

Example 10

Tensile Shear Strength of a Glass-Aluminum Composite

The procedure described in example 9 is repeated with the modification that one of the two glass plates is replaced by an aluminum plate of the same size (but only 1.5 mm in thickness). The results are shown in table 5. While the compositions of examples 1 to 6 without exception display cohesive failure, the measurement in the case of comparative examples 1 and 2 led to adhesion failure over the full area.

TABLE 5

Tensile shear strength of glass-glass and glass-aluminum composites

|  |  | Glass-glass | | Glass-aluminum | |
|---------|----------|-------------|--------------------------------|-------------|--------------------------------|
| Example | Comments | $F_{max}$ [N] | Tensile shear strength [N/mm²] | $F_{max}$ [N] | Tensile shear strength [N/mm²] |
| C1 | adh. | 8.3 | 0.03 | 21.7 | 0.07 |
| C2 | adh. | 12.8 | 0.04 | 10.4 | 0.03 |
| 1 | coh. | 378.2 | 1.3 | 397.1 | 1.3 |
| 2 | coh. | 343.9 | 1.2 | 404.4 | 1.4 |
| 3 | coh. | 718.6 | 2.4 | 725.3 | 2.4 |
| 4 | coh. | 449.7 | 1.5 | 467.8 | 1.6 |
| 5 | coh. | 663.1 | 2.2 | 685.5 | 2.3 |
| 6 | coh. | 551.9 | 1.8 | 717.4 | 2.4 |

Example 11

Encapsulation of Solar Cells

Production of the A Component 69.34 g of a silicone resin-based basic composition consisting of 34.67 g of an MQ resin partially functionalized with vinyldimethylsiloxy groups and having a vinyl content of 0.65 mmol/g, a weight average molecular weight $M_w$ of about 5300 g/mol and a molar M/Q ratio of 42:58 and 34.67 g of a vinyldimethylsiloxy-terminated polydimethylsiloxane having a viscosity of 20,000 mPas (25° C.) are mixed with 30.52 g of a vinyldimethylsiloxy-terminated polydimethylsiloxane having a viscosity of 1000 mPas (25° C.), 0.08 g of divinyltetramethyl-disiloxane and also 0.06 g of a catalyst solution having a Pt content of 1% by weight and containing a platinum-divinyltetramethyldisiloxane complex dissolved in vinyldimethylsiloxy-terminated polydimethylsiloxane having a viscosity of 1000 mPas (25° C.)

Production of the B Component 15.88 g of a vinyldimethylsiloxy-terminated polydimethyl-siloxane having a viscosity of 1000 mPas (25° C.) are mixed with 46.36 g of a hydrogendimethylsiloxy-terminated polydimethylsiloxane having a viscosity of 1000 mPas (25° C.) and 34.33 g of a hydrogendimethylsiloxy-terminated polydimethylsiloxane having a viscosity of 60 mPas (25° C.) 3.43 g of a trimethylsiloxy-end capped copolymer consisting of dimethylsiloxy and methylhydrogensiloxy units in a molar ratio of 1:3 and having a viscosity of 40 mPas and an Si—H content of 1.1% are added and the mixture homogenized.

The above-described composition is mixed in a mixing ratio of 1:1 and briefly evacuated (5 min., 15 mbar) to remove any enclosed air. The reactive mixture obtained in this way is then poured onto a low-iron plate glass as can be obtained, for example, under the trade name AFG Solatex from Interfloat Corporation, Liechtenstein, having dimensions of 15 cm×15 cm and a thickness of 0.4 cm and carefully distributed over the entire glass surface by means of a doctor blade. A commercial, wired solar cell composed of polycrystalline silicon and having the dimensions 10 cm×10 cm is then immediately placed carefully in the still unvulcanized silicone layer in such a way that any enclosed air can escape completely and the entire solar cell is completely surrounded by silicone. Additional reactive mixture is then poured onto the solar cell surface and distributed by means of a doctor blade and a further plate of low-iron plate glass (dimensions as above) was placed on top, taking care that any enclosed air can escape completely when the further plate is laid on. The sandwich was subsequently vulcanized under a weight of 500 g for 1 day at room temperature. A comparative measurement of the current generated by the solar cell laminate was subsequently carried out:

Pure solar cell (100 cm$^2$): 100%
Solar cell+low-iron glass: 95%
Solar cell+silicone layer+low-iron glass: 94%

The solar cell obtained in this way was bonded without cracks or fractures to the glass plate by means of the silicone. The composite of glass, silicone and solar cell was completely transparent (transparency of the silicone layer: about 99%), bubble-free and of high strength.

Example 12

Joining of Two Optical Glass Bodies

Two glass rods (about, length: 100 mm, diameter: 20 mm) are brought by their end faces to a parallel spacing of 1 mm by means of a special holder.

The compositions described above in the examples are mixed with one another in the mixing ratio of A component to B component indicated in each case and briefly evacuated (1 min., 5 mbar) to remove any enclosed air. Reactive mixtures obtained in this way are subsequently introduced by means of a pipette with avoidance of air inclusions into the intermediate space between the end faces of the glass rods (the capillary action leads to complete wetting and complete filling of the gap).

In a modification of this procedure, the reactive mixture corresponding to the composition described in example 6 is firstly applied to the end face of one of the two glass rods to be joined and only then joined to the second glass rod with a parallel spacing of 1 mm with avoidance of any air inclusions.

After vulcanization of the compositions (7 days at room temperature), an attempt is made to separate the adhesively bonded glass rods. The result is shown in table 6.

TABLE 6

Quality of the adhesive bond for glass rods joined at the end faces.

| | |
|---|---|
| Comparative example 1 | neg. |
| Comparative example 2 | neg. |
| Example 1 | pos. |
| Example 2 | pos. |
| Example 3 | pos. |
| Example 4 | pos. |
| Example 5 | pos. |
| Example 6 | pos. | pos.: the glass rods adhesively bonded at the end faces can be separated from one another only with cohesive fracture in the silicone layer.
neg.: the glass rods adhesively bonded at the end faces can be separated from one another without application of great force (adhesion failure on the glass side).

The invention claimed is:

1. A silicone composition which can be crosslinked to form elastomers, comprising:
   (1) organosilicon compound(s) which have SiC-bonded radicals having aliphatic carbon-carbon multiple bonds and comprise units of the formula $$R_a R^1_b SiO_{(4-a-b)/2} \qquad (I),$$ 

where
   the radicals R are identical or different and are each an optionally substituted, SiC-bonded, aliphatically saturated hydrocarbon radical,
   the radicals $R^1$ are identical or different and are each an optionally substituted, SiC-bonded, aliphatically unsaturated hydrocarbon radical,
   a is 0, 1, 2 or 3 and
   b is 0, 1, 2 or 3,
   with the proviso that the sum a+b is less than or equal to 3 and at least two radicals $R^1$ are present per molecule,
   (2) organopolysiloxane(s) which have Si-bonded hydrogen atoms and comprise units of the formula $$R^2_c H_d SiO_{(4-c-d)/2} \qquad (II),$$ 

where
   the radicals $R^2$ are identical or different and each have one of the meanings given above for R,
   c is 0, 1, 2 or 3 and
   d is 0, 1 or 2,
   with the proviso that the sum c+d is less than or equal to 3 and there are on average at least three units of the formula (II) with c=d=1 present per molecule, where the content of Si-bonded hydrogen is greater than or equal to 1.0% by weight,
   (3) essentially linear organopolysiloxane(s) having terminally Si-bonded hydrogen atoms and
   (4) a catalyst which promotes the addition of Si-bonded hydrogen onto aliphatic multiple bonds, with the proviso that the molar ratio of Si-bonded hydrogen originating from component (3) and based on 100 parts by weight of composition, to the sum of the Si-bonded hydrogen originating from the components (2) and (3), in each case based on 100 parts by weight of composition, is in the range from 0.05 to 1, and wherein the composition, which when cured, exhibits a Shore A hardness >5.

2. The composition of claim 1, wherein component (1) comprises essentially linear siloxanes in a mixture with organopolysiloxane resin(s).

3. The composition of claim 2, wherein component (2) comprises linear siloxane(s) or cyclic siloxane(s).

4. The composition of claim 2, wherein organopolysiloxanes (3) are of the formula $$R^3_2HSiO(SiR^3_2O)_pSiR^3_2H \quad (III)$$

where
the radicals $R^3$ are identical or different and are each an optionally substituted, SiC-bonded, aliphatically saturated hydrocarbon radical and
p is 0 or an integer from 1 to 250.

5. The composition of claim 2, wherein the ratio of the proportions by weight of the component (3) to the component (2) is in the range from 60:1 to 0.3:1.

6. The composition of claim 2, wherein the molar ratio of the total SiH groups in the components (2) and (3) to Si-bonded radicals having an aliphatic carbon-carbon multiple bond of the component (1) is from 1.0 to 5.

7. The composition of claim 1, wherein component (2) comprises linear siloxanes or cyclic siloxanes.

8. The composition of claim 7, wherein organopolysiloxane(s) (3) are of the formula $$R^3_2HSiO(SiR^3_2O)_pSiR^3_2H \quad (III)$$

where
the radicals $R^3$ are identical or different and are each an optionally substituted, SiC-bonded, aliphatically saturated hydrocarbon radical and
p is 0 or an integer from 1 to 250.

9. The composition of claim 1, wherein organopolysiloxanes (3) are of the formula $$R^3_2HSiO(SiR^3_2O)_pSiR^3_2H \quad (III)$$

where
the radicals $R^3$ are identical or different and are each an optionally substituted, SiC-bonded, aliphatically saturated hydrocarbon radical, and
p is 0 or an integer from 1 to 250.

10. The composition of claim 1, wherein the ratio of the proportions by weight of the component (3) to the component (2) is in the range from 60:1 to 0.3:1.

11. The composition of claim 1, wherein the molar ratio of the total SiH groups in the components (2) and (3) to Si-bonded radicals having an aliphatic carbon-carbon multiple bond of the component (1) is from 1.0 to 5.

12. A process for producing the composition of claim 1, comprising mixing the individual components in any order.

13. A molding, produced by crosslinking a crosslinkable silicone composition prepared by the process of claim 12.

14. A molding produced by crosslinking the composition of claim 1.

15. The molding of claim 14 which is a material composite in which at least part of the composite consists of a silicone elastomer produced by crosslinking a crosslinkable silicone composition comprising:

(1) organosilicon compound(s) which have SiC-bonded radicals having aliphatic carbon-carbon multiple bonds and comprise units of the formula $$R_aR^1_bSiO_{(4-a-b)/2} \quad (I),$$

where
the radicals R are identical or different and are each an optionally substituted, SiC-bonded, aliphatically saturated hydrocarbon radical,
the radicals $R^1$ are identical or different and are each an optionally substituted, SiC-bonded, aliphatically unsaturated hydrocarbon radical,
a is 0, 1, 2 or 3 and
b is 0, 1, 2 or 3,
with the proviso that the sum a+b is less than or equal to 3 and at least two radicals $R^1$ are present per molecule, (2) organopolysiloxane(s) which have Si-bonded hydrogen atoms and comprise units of the formula $$R^2_cH_dSiO_{(4-c-d)/2} \quad (II),$$

where
the radicals $R^2$ are identical or different and each have one of the meanings given above for R,
c is 0, 1, 2 or 3 and
d is 0, 1 or 2,
with the proviso that the sum c+d is less than or equal to 3 and there are on average at least three units of the formula (II) with c=d=1 present per molecule, where the content of Si-bonded hydrogen is greater than or equal to 1.0% by weight, (3) essentially linear organopolysiloxane(s) having terminally Si-bonded hydrogen atoms and (4) a catalyst which promotes the addition of Si-bonded hydrogen onto aliphatic multiple bonds, with the proviso that the molar ratio of Si-bonded hydrogen originating from component (3) and based on 100 parts by weight of composition to the sum of the Si-bonded hydrogen originating from the components (2) and (3), in each case based on 100 parts by weight of composition, is in the range from 0.05 to 1.

16. A process for producing a material composite, comprising applying a crosslinkable silicone composition of claim 1 to at least one substrate, and crosslinking the crosslinkable silicone composition.

17. The composition of claim 1, wherein the weight ratio of component (3) to component (2) is from 25:1 to 1:1.

18. The composition of claim 1, which when cured, exhibits a Shore A hardness >10.

19. The composition of claim 1, which when cured, exhibits a Shore A hardness of from 20 to 60.

* * * * *